United States Patent
Valencia-Estrada et al.

(10) Patent No.: US 12,372,765 B2
(45) Date of Patent: Jul. 29, 2025

(54) METHOD FOR DESIGNING AN EXPANDED COMPOUND PARABOLIC CONCENTRATOR (ECPC) CORRECTABLE FOR COLLECTING LIGHT IN THE NEAR-FIELD

(71) Applicant: OLEDCOMM, Vélizy-Villacoublay (FR)

(72) Inventors: Juan Camilo Valencia-Estrada, Vélizy-Villacoublay (FR); Alejandro Espinoza-Garcia, Plaisir (FR)

(73) Assignee: OLEDCOMM

( * ) Notice: Subject to any disclaimer, the term of this patent is extended or adjusted under 35 U.S.C. 154(b) by 256 days.

(21) Appl. No.: 18/247,024

(22) PCT Filed: Sep. 21, 2021

(86) PCT No.: PCT/FR2021/051612
§ 371 (c)(1),
(2) Date: Mar. 28, 2023

(87) PCT Pub. No.: WO2022/069815
PCT Pub. Date: Apr. 7, 2022

(65) Prior Publication Data
US 2023/0375814 A1    Nov. 23, 2023

(30) Foreign Application Priority Data
Sep. 30, 2020 (FR) ..................................... 2010004

(51) Int. Cl.
*G02B 19/00* (2006.01)
*H04B 10/116* (2013.01)

(52) U.S. Cl.
CPC ..... *G02B 19/0028* (2013.01); *G02B 19/0076* (2013.01); *H04B 10/116* (2013.01)

(58) Field of Classification Search
CPC ............ G02B 19/0028; G02B 19/0076; H04B 10/116
See application file for complete search history.

(56) References Cited

U.S. PATENT DOCUMENTS

| | | | | |
|---|---|---|---|---|
| 5,357,101 A | * | 10/1994 | Plesko | G02B 19/0019 257/E31.119 |
| 2020/0174237 A1 | * | 6/2020 | Becker | G02B 19/0023 |

FOREIGN PATENT DOCUMENTS

| | | |
|---|---|---|
| FR | 2 330 023 A1 | 5/1977 |
| FR | 2 893 719 A1 | 5/2007 |

OTHER PUBLICATIONS

JR International Search Report as issued in International Patent Application No. PCT/FR2021/051612, dated Jan. 18, 2022.

* cited by examiner

*Primary Examiner* — Abdulmajeed Aziz
*Assistant Examiner* — Nathaniel J Lee
(74) *Attorney, Agent, or Firm* — Pillsbury Winthrop Shaw Pittman LLP (57) ABSTRACT

A compound parabolic concentrator includes a coupling surface for positioning on a sensitive surface of a photodetector of a receiving device, a collecting surface for receiving optical signals, and a side surface located between the coupling surface and the collecting surface, the side surface including two inclined and symmetrical parabolic portions when viewed in a cross-sectional plane passing through a reference axis of the compound parabolic concentrator, wherein the side surface is defined by an equation using input parameters including a dimension of the sensitive surface of the photodetector, an acceptance angle, a first refractive index of a medium in which the compound parabolic concentrator is to be immersed, a second refractive index of a material used to manufacture the compound parabolic concentrator, and a diametrical expansion factor.

19 Claims, 5 Drawing Sheets

METHOD FOR DESIGNING AN EXPANDED COMPOUND PARABOLIC CONCENTRATOR (ECPC) CORRECTABLE FOR COLLECTING LIGHT IN THE NEAR-FIELD

CROSS-REFERENCE TO RELATED APPLICATIONS

This application is the U.S. National Stage of PCT/FR2021/051612, filed Sep. 21, 2021, which in turn claims priority to French patent application number 2010004 filed Sep. 30, 2020. The content of these applications are incorporated herein by reference in their entireties.

The Expanded Compound Parabolic Concentrator is intended to be integrated into an optical signal receiving device used to implement optical wireless communication. The invention relates to the field of optical wireless communication.

BACKGROUND OF THE INVENTION

An Optical Wireless Communication (OWC) system, such as a Light Fidelity (LiFi) communication system, usually comprises two main pieces of equipment:
an access point;
a user terminal.

The access point plays a similar role as that of a WiFi gateway.

The terminal is for example a computer, a smartphone or a tablet. Compatibility of the terminal can be ensured by means of a dongle which is connected, for example, into a USB port on the terminal.

In LiFi, a user can access a network (e.g., the Internet) via his/her terminal as long as the terminal is connected to a nearby access point. Once this connection has been established, the access point can transmit data down from the network to the terminal and therefore to the user, while the terminal can send data up to the network via the access point.

The quality of this bidirectional communication (throughput, latency, coverage, etc.) depends largely on the quality of the optical signals received, both by the terminal and by the access point. This signal quality is usually assessed by the Signal-to-Noise Ratio (SNR), which is the ratio between the received signal power and the received noise power. The higher the received signal power and the lower the noise, the higher the SNR, and thus the higher the communication quality. Optimizing the SNR is therefore critical for improving the performance of an optical wireless communication system, such as a LiFi system.

SUBJECT OF THE INVENTION

A purpose of the invention is to improve the signal-to-noise ratio of an optical wireless communication equipment.

SUMMARY OF THE INVENTION

With a view to achieving this aim, a compound parabolic concentrator is proposed for integration into an optical signal receiving device used to implement optical wireless communication, the compound parabolic concentrator comprising a coupling surface to be positioned on a sensitive surface of a photodetector of the receiving device, a collecting surface for receiving optical signals, and a side surface located between the coupling surface and the collecting surface, the side surface comprising two inclined and symmetrical parabolic portions when viewed in a cross-sectional plane passing through a reference axis of the compound parabolic concentrator, the side surface being defined by an equation using input parameters comprising a dimension of the sensitive surface of the photodetector, an acceptance angle, a first refractive index of a medium wherein the compound parabolic concentrator is to be immersed, a second refractive index of a material used to manufacture the compound parabolic concentrator, and a diametrical expansion factor of the compound parabolic concentrator allowing to increase an overall diameter of the compound parabolic concentrator without increasing its height nor changing the shape of the inclined and symmetrical parabolic portions.

The side surface of the compound parabolic concentrator according to the invention is thus defined on the basis of input parameters including the size of the sensitive surface of the photodetector, the acceptance angle, the first refractive index, the second refractive index, and the diametrical expansion factor.

This way of designing a concentrator is particularly innovative, and the compound parabolic concentrator according to the invention has an optimal size making it possible to concentrate a maximum radiant flux in the photodetector.

A compound parabolic concentrator as described above is further proposed, wherein the side surface is defined by the following equation:

$$z_l = \frac{\left(d_o\left(\frac{1}{2} + \frac{n_\beta}{n_\alpha \sin\alpha}\right) - \sqrt{\left(r - \frac{\text{sign}(r)\Delta d}{2}\right)^2}\right)\sqrt{n_\beta^2 - n_\alpha^2 \sin^2\alpha}}{n_\alpha \sin\alpha} - \frac{n_\beta \sqrt{d_o(n_\beta + n_\alpha \sin\alpha)\left(n_\beta d_o - 2n_\alpha \sin\alpha\left(r - \frac{\text{sign}(r)\Delta d}{2}\right)\right)}}{(n_\alpha \sin\alpha)^2},$$

where $d_o$ is a diameter of the sensitive surface of the detector, $\alpha$ is the acceptance angle, $\alpha$ is the acceptance angle, $n_\alpha$ is the first refractive index, $n_\beta$ is the second refractive index, and $\Delta d$ is such that: $\Delta d = d_o(f_e - 1)$, where $f_e$ is the diametrical expansion factor.

A compound parabolic concentrator as previously described is further proposed, the compound parabolic concentrator being a dielectric concentrator, the first refractive index $n_\alpha$ and the second refractive index $n_\beta$ being such that:

$1 < n_\alpha < n_\beta$.

A compound parabolic concentrator as previously described is further proposed, the compound parabolic concentrator being formed by an assembly of a hollow concentrator and a collection lens comprising the collecting surface.

A compound parabolic concentrator as described above is further proposed, wherein the collecting surface is curved.

A compound parabolic concentrator as described above is further proposed, wherein the collecting surface is defined by the following equation:

$$z_a = z_l(d_i/2) - \frac{cd_i^2}{4 + 2\sqrt{4 - (K+1)c^2 d_i^2}} - \frac{1}{4}\sum_{j=2}^{N} C_{2j} d_i^{2j} + \frac{cr^2}{1 + \sqrt{1 - (K+1)c^2 r^2}} + \sum_{j=2}^{N} C_{2j} r^{2j} + t_e$$

where:
  c is a curvature at the top of the collecting surface;
  K is a conic constant;
  the $C_{2j}$ are aspheric deformation coefficients;
  $d_i$ is a diameter of the collecting surface.

A compound parabolic concentrator as described above is further proposed, wherein:

$$c = -\frac{1}{\left(\frac{n_\beta}{n_\alpha} - 1\right)t_a},$$

$t_a$ being a distance between the top of the collecting surface and a light source with which the optical signal receiving device is arranged to communicate.

A compound parabolic concentrator as described above is further proposed, wherein:

$$K = -(n_\beta/n_\alpha)^2.$$

A compound parabolic concentrator as described above is further proposed, wherein:

$$t_e = 0.$$

A compound parabolic concentrator is further proposed as described above, wherein $t_e$ is a thickness at the edge of the collecting lens.

A compound parabolic concentrator as described above is further proposed, wherein a back surface of the collection lens is defined by the following equation:

$$z_b = z_l(d_i/2) - \frac{c'd_i^2}{4 + 2\sqrt{4 - (K'+1)c'^2 d_i^2}} - \frac{1}{4}\sum_{j=2}^{N} C'_{2j} d_i^{2j} + \frac{c'r^2}{1 + \sqrt{1 - (K'+1)c'^2 r^2}} + \sum_{j=2}^{N} C'_{2j} r^{2j}$$

where:
  c' is a curvature at the top;
  K' is a conic constant;
  the $C'_{2j}$ are aspheric deformation coefficients;
  $z_l(d_i/2) = h$ is a height of the compound parabolic concentrator without the collecting surface;
  $d_i$ is a diameter of the collecting surface.

A compound parabolic concentrator as described above is further proposed, further comprising one or more antireflective or reflective layers applied to the side surface.

A device for receiving optical signals is further proposed, comprising at least one optical assembly comprising a photodetector and a compound parabolic concentrator as previously described, the coupling surface of which is positioned on the sensitive surface of the photodetector.

An optical wireless communication equipment is further proposed comprising an optical signal receiving device as previously described.

Furthermore, an optical wireless communication equipment as described above is proposed, the optical wireless communication equipment being an access point.

An optical wireless communication equipment as described above is further proposed, the optical wireless communication equipment being a user terminal.

A method for designing a compound parabolic concentrator as described above is further proposed, comprising the following successive phases:

a first phase comprising the step of defining the input parameters;

a second phase comprising the step of determining, from the input parameters, output parameters comprising an optimal diameter of the collecting surface, an optimal height of the compound parabolic concentrator, an equation for defining the side surface that uses the input parameters, and a gain of the compound parabolic concentrator, the output parameters providing the compound parabolic concentrator with an optimal overall size for concentrating maximum radiant flux on the photodetector and optimizing its acceptance angle;

a third phase comprising the steps of verifying that the optimal overall size of the compound parabolic concentrator is acceptable with respect to integration constraints into the receiving device, and validating the output parameters for manufacturing the compound parabolic concentrator if this is the case.

A design method as previously described is further proposed, further comprising an intermediate phase, carried out after the second phase and before the third phase, and comprising the step of giving the collecting surface a curved shape.

A design method as previously described is further proposed, wherein a hollow concentrator is obtained at the end of the first phase and the second phase, and wherein the third phase comprises the step of defining a collection lens comprising the collecting surface and which is intended to be assembled with the hollow concentrator to form the compound parabolic concentrator.

A design method as previously described is further proposed, further comprising a fourth phase, implemented following the third step in case the optimal overall size is not acceptable, and comprising a first correction step of changing the optimal diameter of the collecting surface and a diameter of the coupling surface of the compound parabolic concentrator but without changing the optimal height of the compound parabolic concentrator nor the shape of the inclined and symmetric parabolic portions, and/or a second correction step consisting of giving the hollow concentrator an effective height lower than the optimal height so as to obtain an acceptable overall size of the compound parabolic concentrator, and a third step consisting of repeating the second phase and the intermediate phase, if these are implemented, and then the third phase, until an acceptable effective overall size of the compound parabolic concentrator is obtained.

A design process as previously described is further proposed, wherein a dielectric concentrator is obtained at the end of the first phase and the second phase A design method as previously described is further proposed, further comprising a fourth phase, implemented following the third phase in case the optimal overall size is not acceptable, and comprising a first correction step of changing a diameter of the collecting surface and the optimal diameter of the coupling surface of the compound parabolic concentrator but without changing the optimal height of the compound parabolic concentrator nor the shape of the inclined and symmetric parabolic portions, and/or a second correction step consisting of giving the dielectric concentrator an effective height lower than the optimal height so as to obtain an acceptable overall size of the compound parabolic concentrator and/or a third correction step consisting of increasing the second refractive index and reiterating the second phase and the intermediate phase, if the latter is implemented, then the third phase, until an acceptable overall size of the compound parabolic concentrator is obtained.

The invention will be better understood with the aid of the following description of a particular non-limiting embodiment of the invention.

BRIEF DESCRIPTION OF THE DRAWINGS

Reference is made to the appended drawings, of which.

DETAILED DESCRIPTION OF THE INVENTION

The invention is implemented in an optical wireless communication equipment belonging to an optical wireless communication system.

Figure 1:
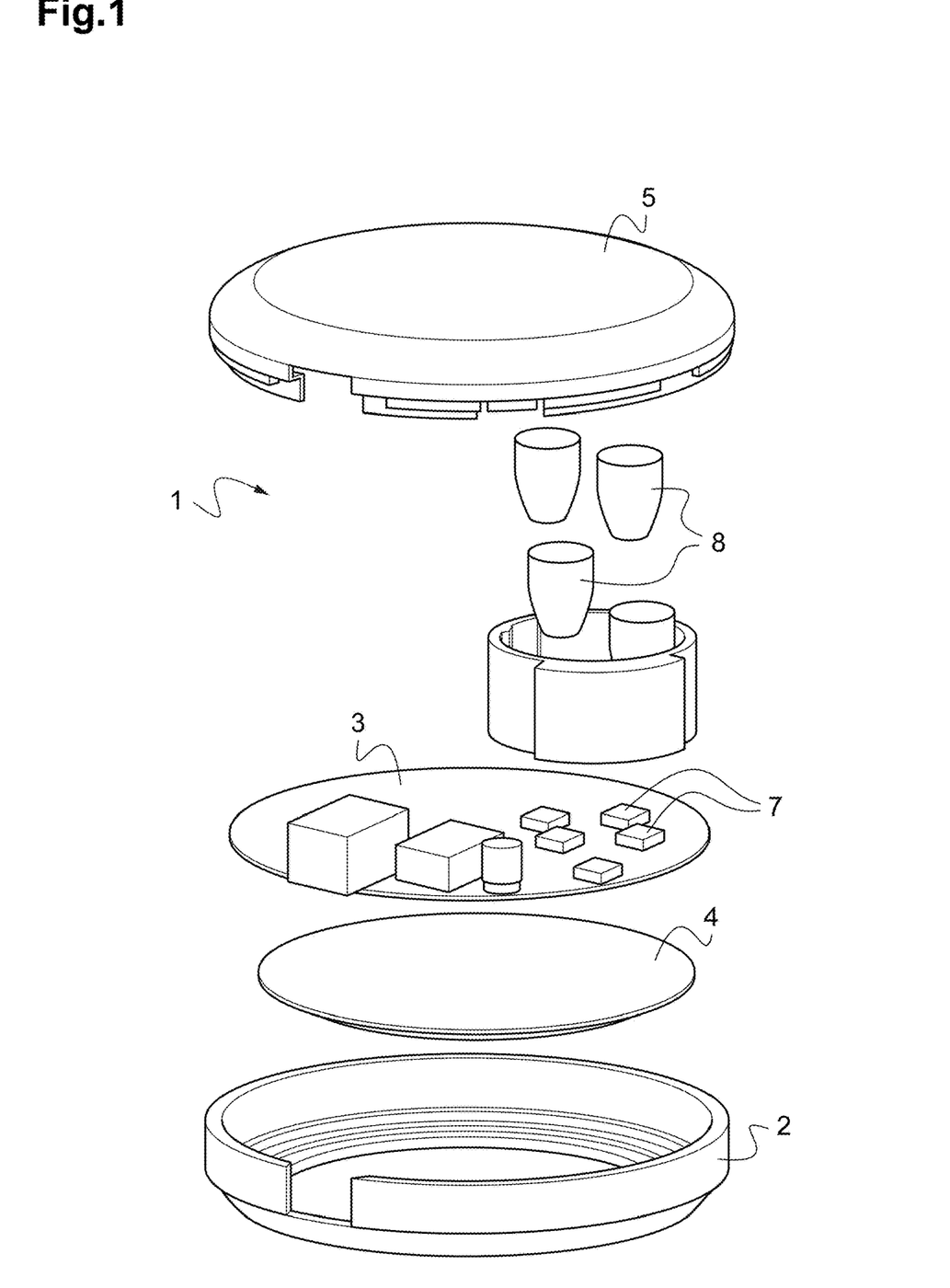
FIG. 1 is an exploded view of an access point wherein the invention is implemented.

With reference to FIG. 1, the equipment here is an access point 1. The optical wireless communication is for example a LiFi communication.

The access point 1 comprises a casing 2 inside which an electrical board 3 is integrated and rests on a support 4 positioned at the bottom of the casing 2. A cover 5 is used to close the casing 2.

The electrical board 3 comprises a number of electrical and optoelectronic components.

Some of these components enable the implementation of an optical signal receiving device. The received optical signals are transmitted by a user's terminal and carry upstream data.

Some of these components enable the implementation of an optical signal transmission device. The transmitted optical signals are received by the user's terminal and carry downstream data.

The receiving device comprises a plurality of photodetectors, which are here photodiodes 7. The photodetectors could be of different types, and comprise for example one or more phototransistors (PT), one or more photoresistors (PR), one or more PIN photodiodes, one or more avalanche photodiodes, one or more SPADs (for Single Photon Avalanche Diode), one or more CMOS (for Complementary Metal Oxide Semiconductor) sensors, etc.

Each photodiode 7 is associated with a compound parabolic concentrator (CPC) according to the invention 8, which is positioned on said photodiode 7.

The CPC 8 is a new type of CPC, which we will be named here ECPC, for "Expanded Compound Parabolic Concentrator".

It is known that light inherently carries energy, but it can also be modulated to transmit a signal. An optical element capable of collecting light is called a concentrator. It is first assumed that a radiative source is located at infinity so that its light can be assimilated to parallel light rays. These light rays enter through the input surface of the concentrator and are directed to the output surface, which may be in contact with an energy transducer or photoelectric detector. Here, as it has just been seen, the output surface is in contact with a photodiode 7. This assumption of parallel incident rays is the physical principle underlying the usual design methods for CPCs. However, the light incident on the CPC actually comes from a nearby object so that the incident light rays are not parallel. It is therefore considered here that a CPC must have as a fundamental characteristic an entrance surface whose shape allows the incident rays passing through it to become as parallel as possible. This particular entrance surface is an optional difference between a conventional CPC and an ECPC according to the invention.

The collecting surface is referred to here as the input surface and the coupling surface as the output surface.

The optical concentrator referred to here is a compound parabolic concentrator which has an external parabolic generatrix defined to collect light on the photodiode. The word "compound" here refers to the fact that the concentrator performs several optical functions implemented in parallel.

Figure 2:
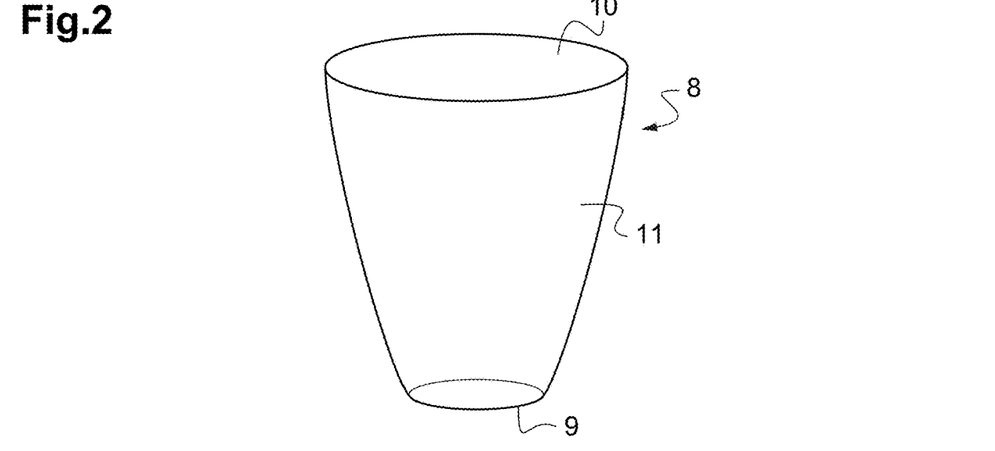
FIG. 2 is a perspective view of an expanded compound parabolic concentrator according to the invention.

With reference to FIG. 2, the ECPC 8 thus has a coupling surface 9, a collecting surface 10 for collecting the light rays, and a side surface 11 located between the collecting surface 10 and the coupling surface 9. The coupling surface 9 is a flat surface with a circular contour (but could be a surface with a different contour, e.g., square, rectangular, etc.) whereas the collecting surface 10 is here a spherical or aspherical, continuous or lenticular (Fresnel type) surface which transforms an ECPC into a near-field corrected optical concentrator, without spherical aberration. This form of collecting surface allows light to be captured more efficiently when it comes from a near-field emitter.

It can be noted that a flat collecting surface is a limit case of an aspherical surface.

The coupling surface 9 is intended to be positioned on a sensitive surface of the photodiode 7, which has a rectangular shape here (but could have a different shape, for example square or circular). The side surface 11 is here a surface of revolution with a parabolic generatrix.

The purpose of the optical concentrator 8 is to focus all the incident light rays on the collecting surface 10 until a certain angle, which is the acceptance angle, towards the coupling surface 9 so that these light rays are captured by the photodiode 7. For this purpose, the ECPC 8 uses the principle of total internal reflection, according to which incident light rays at an angle too high to be focused directly onto the coupling surface 9 will be reflected by the side surface 11 one or more times in order to end up on the coupling surface 9.

Optical concentrators are classified as non-imaging (or anidolic) optical elements. Optical concentrators facilitate the transfer of light radiation between a light source and a target detector. Unlike optical imaging systems, optical concentrators are not designed to form images but to produce an optimal transfer of radiation.

CPCs were originally designed for sunlight concentration applications. Their interest is therefore not in the imaging of an object but in the transfer of energy. Therefore, it is not the individual points of the object that are of interest, but rather its boundaries. In other words, in imaging optics, each individual point belonging to an object must be rendered in the image plane. However, in non-imaging optics, the rays of the bounded object points may arrive blurred in the conjugate plane. Non-imaging optics has been redefined in terms of the thermal behavior inherent in the object source. Non-imaging concentrators are used to transfer energy from a radiating source to a target. The target can be a photovoltaic element or a photodetector (here the target is a photodiode). From a thermodynamic point of view, it has been proposed in the prior art to examine the concentration at geometric and probabilistic scales.

From a geometric optical point of view, it is crucial to establish the maximum concentration ratio of a concentrator with a predefined opening or absorption surface.

The design method is a completely new and particularly innovative method for designing and determining the geometry of a CPC.

Here, the ECPC 8 is reinterpreted not as a radiative element—although it remains a radiative source—but as a signal transmitter.

The ECPC may comprise a hollow concentrator, which is a hollow CPC, assembled with a collection lens on which is defined the collecting surface, which is a flat or curved surface.

The ECPC can also be a dielectric, one-piece concentrator, whose collecting surface 10 is a flat or curved surface.

The dimensioning of the coupling surface 9, the collecting surface 10 and the side surface 11 is critical and must respect several constraints.

The coupling surface 9 should be matched to the sensitive surface of the photodiode 7. The collecting surface should be as large as possible to optimize the number of incident light rays that can be focused onto the coupling surface 9. However, for a fixed coupling surface 9, the larger the collecting surface 10, the higher the optical concentrator 8 will be. On the other hand, a large collecting surface 10 does not facilitate integration into a small space. The side surface 11 should be designed to connect the collecting surface 10 and the coupling surface 9 by maximizing the light reaching the photodetector.

The design method for producing the ECPC differs fundamentally from the methods of the prior art, wherein the CPC is designed by pre-setting the diameter of the collecting surface, while trying to achieve maximum gain for a pre-set refractive index, and expanding the diameter to achieve maximum radiant flux.

The design method used here comprises a plurality of distinct phases, implemented one after the other and in this order: a first phase, a second phase, an intermediate phase, a third phase and a fourth phase. As it will be shown, the intermediate phase is optional.

The purpose of these phases is to dimension the ECPC 8 prior to its manufacture.

The first phase consists of defining the input parameters from which all the most critical dimensions and features of the ECPC 8 will be defined.

The input parameters include an acceptance angle of the concentrator 8, as well as a diameter of the coupling surface 9 and a diametrical expansion factor. The diametrical expansion factor of the compound parabolic concentrator allows an overall diameter of the ECPC to be increased without increasing its height or changing the shape of the inclined and symmetrical parabolic portions that define its side surface. The term "overall diameter" refers to the diameter of the ECPC over its entire height.

The input parameters also include a first refractive index of a medium wherein the ECPC is to be immersed, and a second refractive index of a material used to manufacture the ECPC. The second refractive index should be set to the highest possible value, depending on the availability, price and transmissibility constraints of the materials.

The initial diameter of the coupling surface 9 is defined from at least one dimension of the sensitive surface of the photodiode 7. This point is fundamental: the input data is not the dimensioning of the collecting surface 10, but the dimensioning of the coupling surface 9, which is obtained from the dimensions of the sensitive surface of the photodiode 7 that will actually be used in the access point 1.

The dimension of the sensitive surface of the photodiode 7 is here the length of its diagonal: the diameter of the coupling surface 9 of the ECPC 8 is equal to the length of the diagonal of the sensitive surface of the photodiode 7.

Thus $d_0=\sqrt{a^2+b^2}$, where $d_0$ is the diameter of the coupling surface 9, a is the length and b is the width of the sensitive surface of the photodiode 7.

It is noted that if the sensitive surface of the photodiode was shaped as a square, the diameter of the coupling surface 9 of the ECPC 8 could also be equal to the length of the diagonal of the square. If the sensitive surface of the photodiode had a circular (or elliptical) shape, the diameter of the coupling surface 9 of ECPC 8 could be equal to the maximum diameter of the sensitive surface.

The acceptance angle here is an angle $\alpha$.

As already noted, the ECPC 8 may comprise a hollow (or reflective) concentrator, or it may be a one-piece dielectric (or refractive) concentrator. The hollow concentrator consists only of a side surface 11. Its collecting surface and coupling surface 9 are actually openings. A dielectric concentrator, on the other hand, is solid and thus comprises a side surface 11, a collecting surface 10 and a coupling surface 9.

Then, the second phase comprises the step of determining, from the input parameters, output parameters comprising in a first step an optimal diameter of the collecting surface 10, an optimal height of the ECPC 8, an equation of the side surface 11 of the ECPC 8, and a maximum gain of the ECPC 8. At the end of this first step, the collecting surface is a flat surface.

The second phase then includes a second step which aims to increase the maximum communication angle of the optical concentrator 8. It is in this second step that the CPC is converted to ECPC, i.e., to CPC with an expanded overall diameter. The acceptance angle is a design angle that corresponds to the maximum angle at which beams can be inserted into the optical concentrator. The acceptance angle is different from the maximum communication angle, which is the maximum angle at which optical wireless communication (in this case LiFi communication) can take place. The maximum communication angle is actually smaller than the acceptance angle. This is because, for an angle of incidence greater than the maximum communication angle, the optical power focused on the optical concentrator will be too low, and therefore the SNR too low, for the optical wireless communication link to be functional. The received optical power is insufficient. The maximum communication angle increases as the diameter of the concentrator is expanded, thus increasing the diameter of the capturing surface without changing the height and parabolic geometry of the meridional section. The maximum value of focused radiant flux is reached when the diametrical expansion is equal to $d_o$ ($f_e$=2).

The intermediate phase (which is optional) comprises the step of transforming the flat collecting surface 10 into a curved surface. In the case where the ECPC according to the invention comprises a hollow concentrator, which has an opening at the collecting surface 10, this surface transformation is not directly possible. A collection lens, whose surface follows the equation obtained during this intermediate phase, is then assembled with the hollow concentrator to close it and add a curved collecting surface 10. In the case where the optical concentrator according to the invention is a dielectric concentrator, the collecting surface 10 initially flat at the end of the second phase is transformed into a curved collecting surface 10 according to the equation obtained during this first intermediate phase.

In this optimal configuration, the ECPC 8 has maximum gain and its optical performance is optimized.

The second and intermediate phases are now described in more detail.

In the second phase, the output parameters are defined in a first step as follows.

Figure 3:
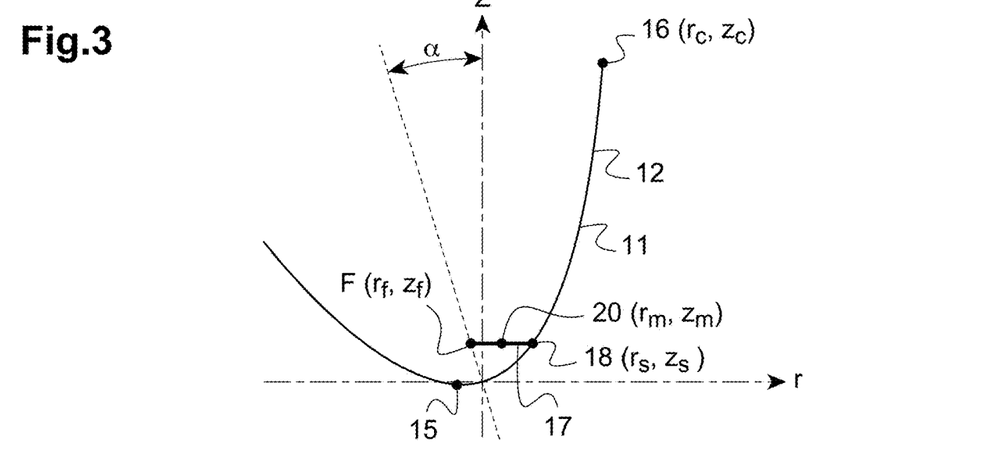
FIG. 3 shows, in a cylindrical coordinate system (r,z), a portion of the parabolic meridional section generating the side surface of the optical concentrator.
Figure 4:
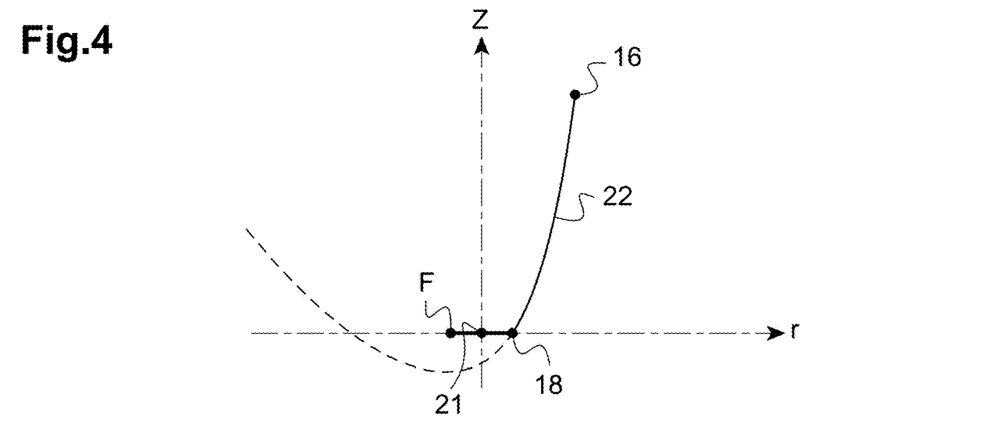
FIG. 4 shows an offset portion of the parabolic meridional section generating the side surface and the coupling surface of the optical concentrator.

To design the side surface 11 of the ECPC 8, we first consider, with reference to FIGS. 3 and 4, a parabolic mirror whose vertex is located at the coordinate origin in a cylindrical coordinate system (r,z).

The parabolic mirror's equation is:

$$z = \frac{r^2}{4f}, \quad (1)$$

where $f>0$ is the focal length and the focal point F has the coordinates (0,$f$). The parabolic mirror 11 requires an inclination in its meridional section (r,z).

The meridional section of a solid is the section of the solid that passes through its reference axis. In FIGS. 3 and 4, this reference axis is the z-axis, which is the axis of rotation of the ECPC 8.

The term "parabolic" for meridional section is used because the side surface 11 is defined by a portion of a parabola, which is the generatrix for revolution. When a meridional section is made, two parabolic portions are obtained, symmetrical with respect to the z axis.

Equation (1) is transformed into polar coordinates (R,θ) using the following changes of variables:

$$\{r \to R \cos\theta\}, \{z \to R \sin\theta\}. \quad (2):$$

This gives the following implicit second-degree equation:

$$R\sin\theta = \frac{(R\cos\theta)^2}{4f}, \quad (3)$$

whose explicit solution is:

$$R = 4f \sec\theta \tan\theta. \quad (4):$$

The inclination process requires the addition or subtraction of an angle that corresponds to the acceptance angle α of the optical concentrator. By rotating the parabola around its apex by an angle α, the corresponding polar ray is:

$$R = 4f \sec(\theta-\alpha)\tan(\theta-\alpha). \quad (5):$$

In FIG. 3, the focal point after rotation F can be observed.

It can be noted that FIG. 3 was constructed using a parabola with a focal length of $f$=3,194 mm, with a rotation angle α=16.1 degrees.

The coordinates of the focal point after rotation F are:

$$(r_f, z_f) = (-f \sin\alpha, f \cos\alpha). \quad (6):$$

An inverse coordinate transformation is used to find the equation of the inclined parabola in cylindrical coordinates. The following change of variables and functions is used:

$$\left\{R \to \sqrt{r^2+z^2}\right\}, \left\{\cos\theta \to \frac{r}{\sqrt{r^2+z^2}}\right\}, \left\{\sin\theta \to \frac{z}{\sqrt{r^2+z^2}}\right\}. \quad (7)$$

Substituting this change into the root $R=4f \sec(\theta-\alpha)\tan(\theta-\alpha)$ and simplifying, we obtain the implicit representation of the inclined parabola in cylindrical coordinates:

$$1 = 4f \frac{z\cos\alpha - r\sin\alpha}{(r\cos\alpha + r\sin\alpha)^2}. \quad (8)$$

Solving this equation according to the variable z, we obtain two real solutions. These solutions describe a piecewise function for the meridional section of the inclined parabola.

The following equation represents the desired curve 12:

$$z = -\cot\alpha(r - 2f \csc\alpha) - \sqrt{2} \csc^2\alpha \sqrt{f(f + f\cos 2\alpha - 2r\sin\alpha)}. \quad (9):$$

The vertex 15 shown in FIG. 3 is determined. The Cartesian coordinates ($r_c$, $z_c$) of the critical point 16 where the discontinuity occurs are found when the kernel of the root in equation (7) disappears. The discriminant of this equation:

$$f(f + f \cos 2\alpha - 2r_c \sin\alpha) = 0, \quad (10):$$

allows us to find the radius of the critical cylinder, which corresponds to the upper abscissa of the section located in the first quadrant $\{r_c \to f \cos\alpha \cot\alpha\}$.

Using this expression for the radius of the critical cylinder in equation (4), we obtain the coordinates of the critical point 16:

$$(r_c, z_c) = (f \cos\alpha \cot\alpha, f(\cos\alpha + \csc\alpha \cot\alpha)). \quad (11):$$

It should be noted that at the critical point 16, the tangent line to the meridional curve has an infinite slope. A straight line 17 is constructed which passes through the focus F and is parallel to the axis r of the meridional section, as shown in FIG. 3. By equating equation (11) with $z_f$ in equation (6), it is possible to obtain the abscissa of the point of intersection 18 ($r_s$, $z_s$) of the straight line 17 and the side surface 11:

$$-\cot\alpha(r_s - 2f \csc\alpha) - \sqrt{2} \csc^2\alpha \sqrt{f(f + f\cos 2\alpha - 2r_s\sin\alpha)} = f \cos\alpha, \quad (12):$$

with a positive solution for $r_s$:

$$\{r_s \to 2f \sec^2\alpha - f(\sin\alpha + 2 \sec\alpha \tan\alpha)\}. \quad (13):$$

The coordinates of the intersection point 18 are thus reduced to:

$$(r_s, z_s) = (2f \sec^2\alpha - f(\sin\alpha + 2 \sec\alpha \tan\alpha), f \cos\alpha). \quad (14):$$

Thus, the diameter $d_0$ of the exit opening of the optical concentrator can be calculated, which corresponds to the distance between the focal point F and the intersection point 18.
We have:

$$d_0 = (r_s - r_f), \qquad (15)$$

with $$\{r_s \to 2f\sec^2\alpha - f(\sin\alpha + 2\sec\alpha\tan\alpha), r_f \to -f\sin\alpha\}, \qquad (16)$$

which, when evaluated and simplified, becomes:

$$d_0 = 2f\sec\alpha(\sec\alpha - \tan\alpha). \qquad (17)$$

It is now possible to determine the coordinates $(r_m, z_m)$ of the midpoint 20 of the exit opening according to:

$$(r_m, z_m) = (r_f + d_0/2, z_f), \qquad (18)$$

which, after evaluation with: $\{r_f \to -f\sin\alpha, d_o \to 2f(\sec\alpha - \tan\alpha)\sec\alpha\}$ and $\{z_f \to f\cos\alpha\}$, then simplification, is reduced to:

$$(r_m, z_m) = (f(\sec^2\alpha - \sin\alpha - \sec\alpha\tan\alpha), f\cos\alpha). \qquad (19)$$

The coordinates of the midpoint 20 allow to define the parabola after rotation using $\{\{r \to r+r_m\}, \{z \to z+z_m\}\}$ and equation (9). In this way, the midpoint 20 $(r_m, z_m)$ and the origin point 21 of the coordinates of the optical concentrator 8 coincide, as can be seen in FIG. 4. The following equation for the parabola is thus obtained:

$$z = -\cot\alpha(r + r_m - 2f\csc\alpha) - \frac{\sqrt{2f(f + f\cos(2\alpha) - 2(r+r_m)\sin\alpha)}}{\sin^2\alpha} - z_m. \qquad (20)$$

The side profile 22 of the first quadrant is obtained after evaluation and simplification of equation (20):

$$z = -(r - 2f\csc\alpha)\cot\alpha + f(1 - \csc\alpha)\sec\alpha - 2\frac{\sqrt{f\left(\frac{f}{1+\sin\alpha} - r\sin\alpha\right)}}{\sin^2\alpha}. \qquad (21)$$

Nevertheless, to construct a surface of side revolution, the odd function in equation (21) must be transformed into an even function by performing the following change of variables $\{\{r \to \sqrt{r^2}\}, \{z \to z_l\}\}$, which gives:

$$z_l = -\left(\sqrt{r^2} - 2f\csc\alpha\right)\cot\alpha + f(1-\csc\alpha)\sec\alpha - 2\frac{\sqrt{f\left(\frac{f}{1+\sin\alpha} - \sqrt{r^2}\sin\alpha\right)}}{\sin^2\alpha}. \qquad (22)$$

It is now possible to find the new coordinates of all the essential points described in the demonstration and visible in FIG. 3:

a) The critical point 16 of the maximum slope:

$$(r_c, z_c) = \left(\frac{f\csc\alpha}{1+\sin\alpha}, f\csc\alpha\cot\alpha\right); \qquad (23)$$

b) The focal point F:

$$(r_f, z_f) = (-f\sin\alpha - r_m, f\cos\alpha - z_m) = (f\sec\alpha(\tan\alpha - \sec\alpha), 0); \qquad (24)$$

c) The point of intersection 18:

$$(r_s, z_s) = (f(\sec\alpha - \tan\alpha)\sec\alpha, 0). \qquad (25)$$

It is therefore verified that the focal point F and the point of intersection 18 are symmetrical points.

It is important to mention that the maximum height of the concentrator corresponds to the ordinate of point 16, i.e.:

$$h_{max} = f\cot\alpha\csc\alpha. \qquad (26)$$

First, we consider the case where the ECPC includes a hollow concentrator.

Figure 5:
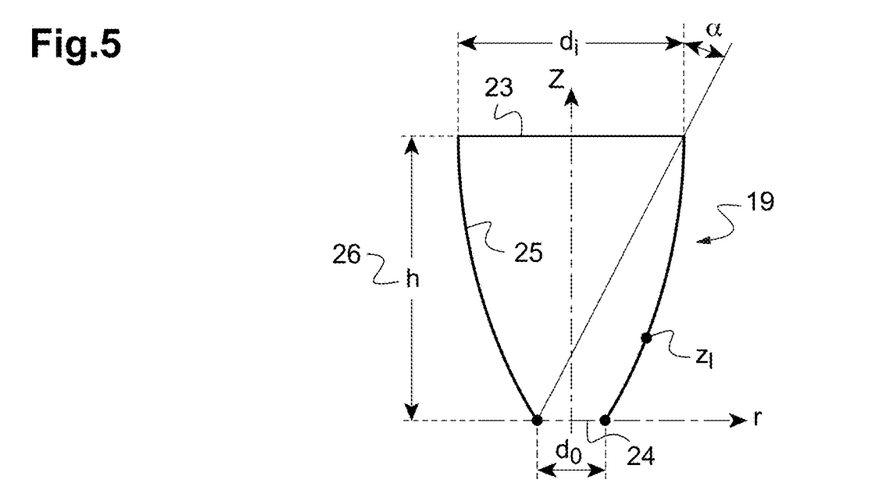
FIG. 5 shows a hollow CPC without a collection lens.

FIG. 5 shows a hollow concentrator of revolution 19. It consists of a concave mirror with an entrance opening 23 of diameter $d_i$ which collects the light emitted by a radiant source located at infinity. The entrance opening 23 corresponds to the collecting surface.

The hollow concentrator 19 conducts the light entering through the entrance opening 23 into the exit opening 24 of diameter $d_o$. The exit opening 24 corresponds to the coupling surface.

This optical system, well known in the usual state of the art, consists of two independent optical subsystems that collect light in parallel: a first subsystem that receives light through its exit opening 24, and a second subsystem that reflects the incident light in the side internal mirror onto the exit opening 24. Hence, this type of optical system is called a compound optical system.

Two variables are used to design the hollow concentrator 19 (which are the input parameters): the diameter $d_o$ of the exit opening 24 (i.e., the diameter of the coupling surface 9—assuming a rotationally symmetrical concentrator), and the semi-angular acceptance field noted $\alpha$ (this is the acceptance angle).

These input parameters are used to find the diameter $d_i$ of the entrance opening, the height 26 of the hollow concentrator 19 with the dimension h, and the geometry of the mirror 25 including the side surface $z_l$.

Previously, the basic formulation for the parabola after rotation was deduced as a function of only two parameters: the acceptance angle $\alpha$ and the focal length $f$. These formulations allow us to deduce in the following the expressions needed to design the hollow CPC 19 according to $d_o$ and $\alpha$.

From equation (17), we can solve for $f$ according to $d_o$ and $\alpha$:

$$f = \frac{d_o(1 + \sin\alpha)}{2}. \qquad (27)$$

This expression for $f$ is then used in equation (22) to express the side surface as a function of $d_o$ and $\alpha$, as shown by:

$$z_l = \cot\alpha\left(\frac{d_o}{2} + d_o\csc\alpha - \sqrt{r^2}\right) - \frac{\sqrt{d_o(1+\sin\alpha)\left(d_o - 2\sqrt{r^2}\sin\alpha\right)}}{\sin^2\alpha}. \qquad (28)$$

The entrance opening 23 with diameter $d_i$ must fulfil the condition $0 < d_i \leq d_{imax}$. The upper limit of the interval is obtained with equations (23) and (27). Thus, the maximum diameter of the entrance opening 23 is:

$$d_{imax} = d_0\csc\alpha. \qquad (29)$$

This maximum diameter is also the optimal diameter of the collecting surface.

The maximum height 26 of the hollow concentrator 19 is then calculated by substituting equation (26) for equation (27):

$$h_{max} = \frac{d_0 \cos\alpha(1 + \sin\alpha)}{2\sin^2\alpha}. \tag{30}$$

Calculating the optimal height h of the hollow CPC with the condition $\{0 < h \leq h_{max}\}$ requires understanding its optical function as a function of its optical gain G. Suppose that light emerging from a radiative source located at infinity arrives collimated in a CPC and that all the radiation striking the collecting surface is collected in the coupling output surface. Assume that the efficiency is 100%. Then the maximum gain is $G_{max} = E_o/E_i$, where $E_o$ is the irradiance of the exit opening (radiant flux density, in [Watts/m2]), and $E_i$ is the irradiance at the entrance opening.

If the exit and entrance powers are $W_o$ and $W_i$ respectively, and both are equal, the gain is reduced to:

$$G_{max} = \left(\frac{d_i}{d_o}\right)^2. \tag{31}$$

The gain is the ratio of the area of the collecting surface $A_i$ to that of the coupling surface $A_o$. There is a dependency between the area of the collecting surface $A_i$ and the height h of the hollow CPC. Evaluating equation (28) with $r = d_i/2$, it can be seen that:

$$h = -\cot\alpha\left(\frac{d_i}{2} - \frac{d_o}{2} - d_o \csc\alpha\right) - \frac{\sqrt{d_o(1 + \sin\alpha)(d_o - d_i \sin\alpha)}}{\sin^2 a}. \tag{32}$$

This equation has an analytical solution for $d_i > 0$ with:

$$d_i = \tag{33}$$

$$d_o + \frac{2}{\cos^2\alpha}\left(\frac{\csc\alpha\sqrt{(d_o\sin\alpha(1 + \sin\alpha))^2 + hd_o\sin\alpha(1 + \sin\alpha)\sin(2\alpha)} -}{d_o(1 + \sin\alpha) - h\sin\alpha\cos\alpha}\right)$$

Replacing $d_i$ in equation (33) with equation (31), the maximum gain as a function of acceptance, the diameter of the coupling surface and the height of the hollow CPC is:

$$G_{max} = \tag{34}$$

$$\left(1 + \frac{2}{\cos^2\alpha}\left(\csc\alpha\sqrt{(\sin\alpha(1+\sin\alpha))^2 + \frac{h\sin\alpha(1+\sin\alpha)\sin(2\alpha)}{d_o}} - \frac{h\sin\alpha\cos\alpha}{d_o}\right)\right)^2,$$

Assuming $d_o = 1$ and normalizing the hollow CPC with the ratio $h/d_o$, the maximum normalized gain of the concentrator can be expressed as a function of its normalized height and the acceptance angle.

Figure 6:
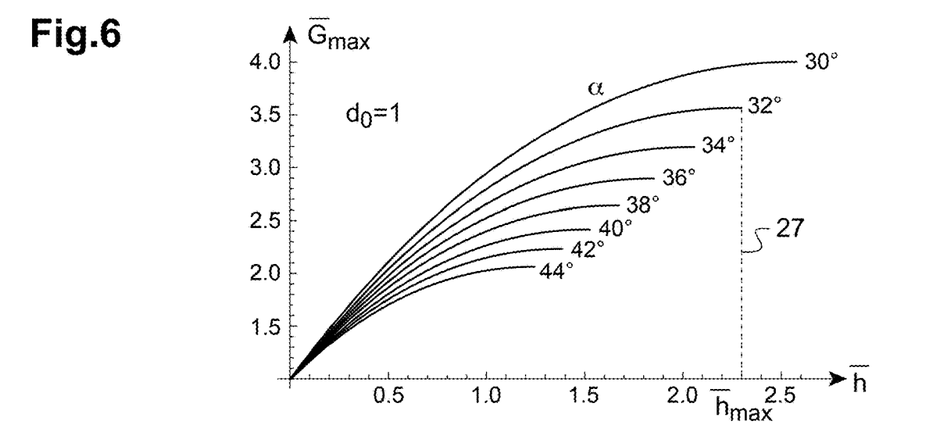
FIG. 6 shows different curves, at different acceptance angles, of a normalized maximum gain ($d_o=1$) as a function of the height of the hollow CPC.

FIG. 6 shows the expected normalized maximum gain curves for a normalized hollow CPC. The normalized maximum gain curves for the following eight acceptance angles α are shown: 30, 32, 34, 36, 38, 40, 42 and 44 degrees.

It is then easy to conclude that the hollow concentrator must be designed for a height equal to the maximum height 27 in order to achieve maximum gain, which is possible if there is no height restriction in the CPC design specification. CPCs with a height less than the maximum height 27 are called "truncated CPCs". The optimal height of the hollow CPC 19 is therefore the maximum height.

The set of equations (35a)-(35d) required to model the hollow CPCs is produced:

$$d_{imax} = \frac{d_0}{\sin\alpha}, \tag{35a}$$

$$h_{max} = \frac{d_0\cos\alpha(1 + \sin\alpha)}{2\sin^2\alpha}, \tag{35b}$$

$$z_l = \cot\alpha\left(\frac{d_o}{2} + d_o\csc\alpha - \sqrt{r^2}\right) - \frac{\sqrt{d_o(1 + \sin\alpha)(d_o - 2\sqrt{r^2}\sin\alpha)}}{\sin^2\alpha}, \tag{35c}$$

$$G_{max} = \frac{1}{\sin^2\alpha}. \tag{35d}$$

The set of equations (35) includes the output parameters, which are thus the optimal diameter $d_{i\,max}$ of the collecting surface 10, the optimal height $h_{max}$ of the CPC, the equation of the parabola portions, and the maximum gain $G_{max}$.

The second step in the second phase of creating a hollow CPC is to increase the maximum communication angle and to increase the radiant flux at the photodetector. For this purpose, the optical concentrator 19 is expanded by homothety, more precisely by enlargement (FIG. 7), resulting in our new ECPC. For this, an expansion factor $f_e$ is predefined with the condition $1 < f_e < 2$, to diametrically expand a hollow CPC with the change of variable $\{r \rightarrow (r - \text{sign}(r)\Delta d/2)\}$, where $\Delta d = d_o(f_e - 1)$, resulting in the set of equations (36a)-(36b):

$$d_{imax} = \frac{d_0}{\sin\alpha} + \Delta d \tag{36a}$$

$$\tag{36b}$$

$$z_l = \cot\alpha\left(\frac{d_o}{2} + d_o\csc\alpha - \sqrt{\left(r - \frac{\text{sign}(r)\Delta d}{2}\right)^2}\right) -$$

$$\frac{\sqrt{d_o(1 + \sin\alpha)\left(d_o - 2\sqrt{\left(r - \frac{\text{sign}(r)\Delta d}{2}\right)^2}\sin\alpha\right)}}{\sin^2\alpha},$$

The value of the diametrical increment $\Delta d$ is determined experimentally, taking into account the excitability of the transmitter, to obtain a larger communication angle. After expansion, the diameter of the coupling surface is also transformed into $\{d_o \rightarrow f_e d_o = d_o + \Delta d\}$. It is important to note the geometry of the side surface 25 is nevertheless calculated with the unexpanded diameter, which is the main feature of the concentrator proposed here. This technique, which is not referenced in the existing literature, allows a hollow CPC to be transformed into a hollow ECPC with internal focal points F and F' at the coupling section 24, as shown in FIG. 7.

The dimensions of the hollow CPC 19 in FIG. 5 are: $d_o = 4.4$ mm, $\alpha = 37.5°$, $h = 7.577$ mm, and $d_i = 7.228$ mm. The side surface has a focal length $f = 3.539$ mm.

Figure 7:
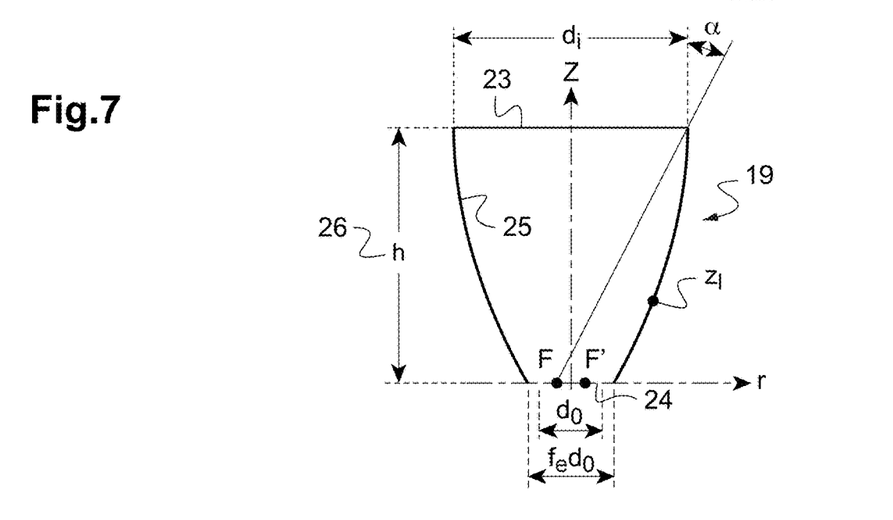
FIG. 7 shows a hollow ECPC without an additional lens as a collecting surface.

The hollow CPC 19 shown in FIG. 7 was then obtained from the hollow CPC 19 of FIG. 5 by expansion. The dimensions of the hollow CPC 19 in FIG. 7 are as follows: $\Delta d=0.8$ mm, $d_o=4.4+\Delta d$ mm=5.2 mm, $\alpha=37.5°$, h=7,577 mm, and $d_i=7.228+\Delta d=8,028$ mm. The side surface has a focal length $f=3,539$ mm.

We now turn to the case where the optical concentrator 8 according to the invention does not comprise a hollow CPC, but is a dielectric (or refractive) concentrator, and we describe the first step of the second design phase of such a dielectric CPC.

Figure 8:
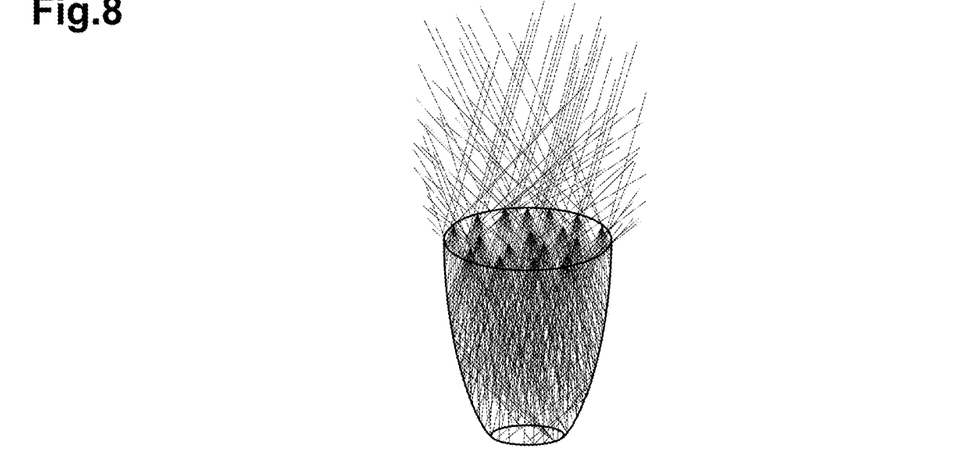
FIG. 8 shows light rays in a dielectric concentrator.

FIG. 8 shows the path of the light rays in a dielectric CPC of height h, collecting surface diameter $d_i$, coupling surface diameter $d_o$. This figure shows the total internal reflection (TIR) of the rays on the side surface.

Figure 9:
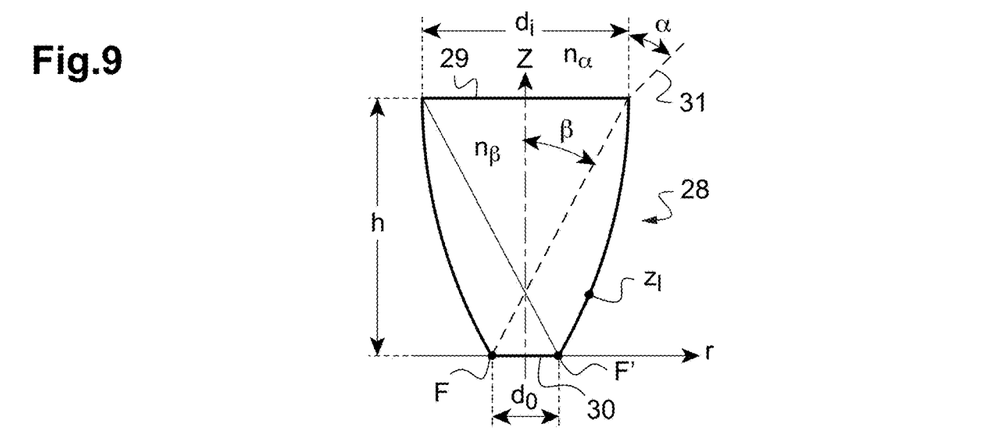
FIG. 9 shows a dielectric CPC with a flat collecting surface.

The concentrator 28 in FIG. 9 is a dielectric revolution concentrator. This concentrator is a monolithic, transparent CPC 28 with a reflective surface. It is assumed that the CPC 28 is made of an isotropic and homogeneous material of refractive index $n_\beta$, and immersed in an external medium of lower refractive index $n_\alpha$. By "immersed" is meant that the CPC 28 is fully immersed in a liquid or gaseous medium. Here, the medium is air (but the medium could be different, for example water).

The refractive index $n_\beta$ is an input parameter of the first phase.

The material from which the CPC is made can be, for example, glass or plastic, e.g., polycarbonate (PC), polymethylmethacrylate (PMMA) or silicone. Here the CPC is made of plastic.

It is assumed that the collecting surface 29 of the CPC 28 is flat. The diameter $d_i$ of the collecting surface 29 allows light to be collected from a radiation source located at infinity. The function of the CPC is to bring the light from the collecting surface 29 to the coupling surface 30. The coupling surface 30 of diameter $d_o$ is in physical contact with the sensitive surface of the photodiode.

A light ray 31 striking the collecting surface 29 with an acceptance angle $\alpha$ is refracted into the CPC with a smaller internal acceptance angle $\beta$, with the condition $n_\beta > n_\alpha$. The Snell-Descartes law governs the relationship between these two rays, and gives $\beta = \sin^{-1}(n_\alpha \sin\alpha / n_\beta)$.

Given the condition $\beta < \alpha$, it can be concluded that a dielectric concentrator is more advantageous than a hollow concentrator. A dielectric CPC increases the maximum gain according to:

$$G_{max} = \left(1 + \frac{2}{\cos^2\beta}\left(\csc\beta\sqrt{\begin{array}{c}(\sin\beta(1+\sin\beta))^2 + \\ (h/d_o)\sin\beta(1+\sin\beta)\sin(2\beta) - \\ (1+\sin\beta) - (h/d_o)\sin\beta\cos\beta\end{array}}\right)\right)^2 \quad (37)$$

Figure 10:
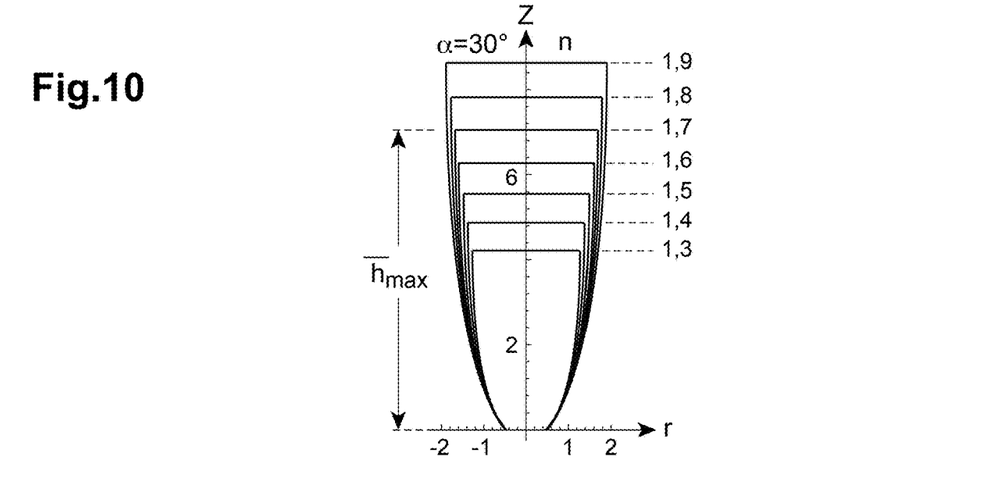
FIG. 10 shows the variation, as a function of refractive index, of the optimum meridional cross-section of a normalized dielectric CPC ($d_o=1$), i.e., the meridional cross-section allowing the light to be concentrated with maximum gain.

FIG. 10 shows the variation of the optimal meridional cross-section (in terms of optical gain) for a normalized dielectric CPC, as a function of its relative refractive index $n = n_\beta / n_\alpha$. Here, $\alpha = 30°$.

From a quick comparison of equations (34) and (38) we can see that the only difference is the angle. Consequently, the equations obtained for a hollow CPC remain valid for dielectric CPCs by changing the variable $\{\alpha \to \beta\}$. The set of equations (35a)-(35d) needed to design a rotationally symmetric dielectric CPC with maximum gain thus reduces to:

$$d_{i\,max} = \frac{d_0}{\sin\beta}, \quad (38a)$$

$$h_{max} = \frac{d_0 \cos\beta(1 + \sin\beta)}{2\sin^2\beta}, \quad (38b)$$

$$(38c)$$

$$z_l = \cot\beta\left(\frac{d_o}{2} + d_o\csc\beta - \sqrt{r^2}\right) - \frac{\sqrt{d_o(1+\sin\beta)\left(d_o - 2\sqrt{r^2}\sin\beta\right)}}{\sin^2\beta},$$

$$G_{max} = \frac{1}{\sin^2\beta}. \quad (38d)$$

By substituting $\{\beta \to \sin^{-1}(n_\alpha \sin\alpha / n_\beta)\}$ into equation (27) and then simplifying, this set of equations becomes the set of equations (39a)-(39d):

$$d_{imax} = \frac{n_\beta d_0}{n_\alpha \sin\alpha}, \quad (39a)$$

$$h_{max} = \frac{d_o(n_\alpha \sin\alpha + n_\beta)\sqrt{n_\beta^2 - n_\alpha^2 \sin^2\alpha}}{2 n_\alpha^2 \sin^2\alpha}, \quad (39b)$$

$$z_l = \frac{\left(d_o\left(\frac{1}{2} + \frac{n_\beta}{n_\alpha \sin\alpha}\right) - \sqrt{r^2}\right)\sqrt{n_\beta^2 - n_\alpha^2 \sin^2\alpha}}{n_\alpha \sin\alpha} - \quad (39c)$$

$$\frac{n_\beta \sqrt{d_o(n_\beta + n_\alpha \sin\alpha)\left(n_\beta d_o - 2\sqrt{r^2} n_\alpha \sin\alpha\right)}}{(n_\alpha \sin\alpha)^2}$$

$$G_{max} = n_\beta^2 / (n_\alpha^2 \sin^2\alpha) \quad (39d)$$

The set of equations (39a)-(39d) includes the output parameters, which are thus the optimal diameter of the collecting surface $d_{i\,max}$, the optimal height $h_{max}$ of the CPC, the equation of the side surface of revolution, and the maximum gain $G_{max}$.

The second step of the second phase of the design of a dielectric CPC is to increase the maximum communication angle and the radiant flux at the photodetector. For this purpose, the optical concentrator 28 is expanded by homothety, more precisely by enlargement (FIG. 11), resulting in our new dielectric ECPC.

Figure 13:
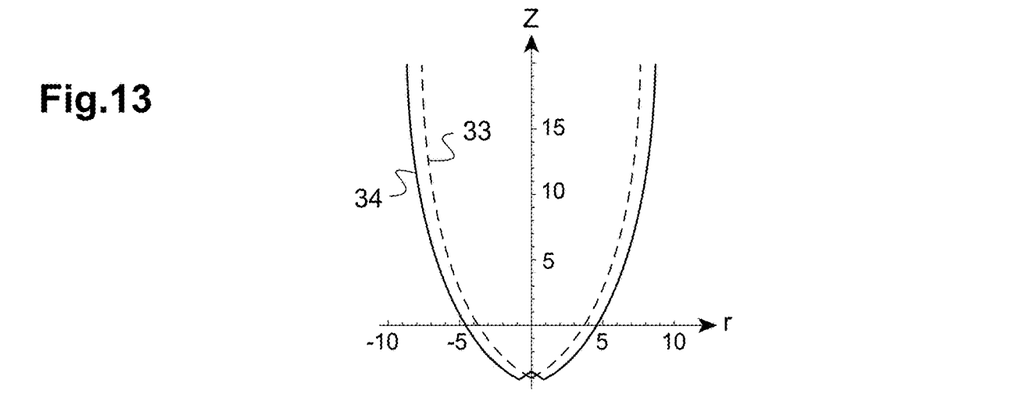
FIG. 13 shows the side surface of the concentrator before and after it has been enlarged by expansion.

Only the diameter of the collecting surface 29 and the optimal diameter of the coupling surface 30 are increased by this homothety. The optimal height h of the optical concentrator and the parabolic generatrix are not changed, although the equation of the side surface $z_l$ changes. Thus, FIG. 13 shows the side surface 33 of the optical concentrator before the implementation of the second step of the second phase, and the side surface 34 of the optical concentrator after the implementation of the second step of the second phase. It can be seen that the radial offset is constant between the two side surfaces 33 and 34.

In order to implement this expansion, an expansion factor $f_e$ is predefined with the condition $1 < f_e < 2$, to diametrically expand the dielectric CPC with the change of variable $\{r \to (r - \text{sign}(r)\Delta d/2)\}$, where $\Delta d = d_o(f_e - 1)$, thus obtaining the set of equations (40a)-(40b):

$$d_{imax} = \frac{n_\beta d_0}{n_\alpha \sin\alpha} + \Delta d \quad (40a)$$

$$z_l = \frac{\left(d_o\left(\frac{1}{2} + \frac{n_\beta}{n_\alpha \sin\alpha}\right) - \sqrt{\left(r - \frac{\text{sign}(r)\Delta d}{2}\right)^2}\right)\sqrt{n_\beta^2 - n_\alpha^2 \sin^2\alpha}}{n_\alpha \sin\alpha} - \quad (40b)$$

$$\frac{n_\beta \sqrt{d_o(n_\beta + n_\alpha \sin\alpha)\left(n_\beta d_o - 2n_\alpha \sin\alpha\left(r - \frac{\text{sign}(r)\Delta d}{2}\right)\right)}}{(n_\alpha \sin\alpha)^2}.$$

These two equations are the most important because they describe the main features of a dielectric ECPC. If $n_\alpha = n_\beta$, the dielectric ECPC is transformed into a hollow ECPC. In other words, any ECPC can be represented with equations (40a), (39b), (40b) and (39d).

The value of the diametrical increment $\Delta d$ s determined experimentally, taking into account the excitability of the transmitter, to obtain a larger communication angle.

Figure 11:
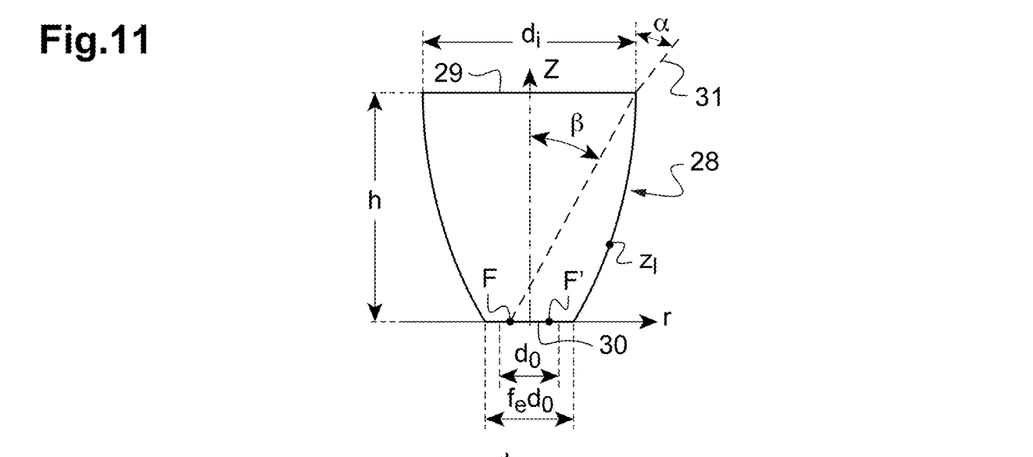
FIG. 11 shows a dielectric ECPC with a flat collecting surface.

After expansion, the diameter of the coupling surface is also transformed into $\{d_o \to f_e d_o = d_o + \Delta d\}$. It is important to note that the geometry of the side surface 19 is nevertheless calculated with the unexpanded diameter, which is the main feature of the concentrator proposed here. This technique, which is not referenced in the existing literature, allows a dielectric CPC to be transformed into a dielectric ECPC with internal focal points F and F' at the coupling section 30, as shown in FIG. 11.

After enlargement, the diameter of the collecting surface and the optimal diameter of the coupling surface are each increased by a value equal to $\Delta d$.

This change in diameters, when manufacturing the optical concentrator 8, increases the maximum communication angle by 5° when $\Delta d=1.6$ mm. The acceptance angle of $\beta=65°$ remains the same.

Advantageously, the $\Delta d$ used is made dependent on the communication performance of the modem of the access point receiving device, i.e., its ability to establish communication with a given SNR. The $\Delta d$ used is therefore not solely dependent on optical properties.

From equation (40b) the following equation can be derived:

$$z = -11{,}3591 + 9{,}258\sqrt{12{,}5714 - 1{,}81311\sqrt{(r-0{,}8\,\text{sign}(r))^2}} - 1{,}63826 \times \sqrt{(r-0{,}8\,\text{sign}(r))^2}. \tag{41}$$

This equation is of the form: $z=f(r)$.

The function $f$ is obtained as follows: $z=f(r)=h_{max}-z_l$, with $h_{max}$ and $z_l$ defined according to the set of equations (39b) and (40b).

To obtain this equation, the following parameters were used.

The sensitive surface of the photodiode has length a and width b: a=5.4 mm, b=4.8 mm.

The diameter of the coupling surface $d_o=\sqrt{a^2+b^2}=7.225$ mm is calculated.

The acceptance angle is: $\alpha=65°$.

The diametrical increase is: $\Delta d=1.8$ mm.

The first refractive index $n_\alpha$ corresponds to the refractive index of the air wherein the ECPC is immersed, i.e., $n_\alpha \cong 1{,}000275$.

The second refractive index $n_\beta$ corresponds to the refractive index of the material with which the ECPC is made. Here we have: $n_\beta=1.74$. It is noted that the refractive index of the material is equal to 1.76 for yellow light but is equal to 1.74 for infrared light ($\lambda_r=840$-$940$ nm).

For a predefined acceptance angle $\alpha$, and a normalized exit opening $d_o=1$, $\overline{d_{imax}}$ and $\overline{h_{max}}$ are calculated from equations (40a) and (39b).

The output parameters give the optical concentrator an optimal overall size to concentrate maximum radiant flux on the photodetector.

At this stage of the design, the resulting optical concentrator can be likened to an ECPC (hollow or dielectric) in that its collecting surface 10 is flat.

The (optional) intermediate phase consists of transforming this ECPC into an ECPC with a spherical or aspherical curved refractive collecting surface. This curved collecting surface allows the radiant flux concentrated on the photodetector to be optimized when it comes from a near field light emitter.

Figure 12:
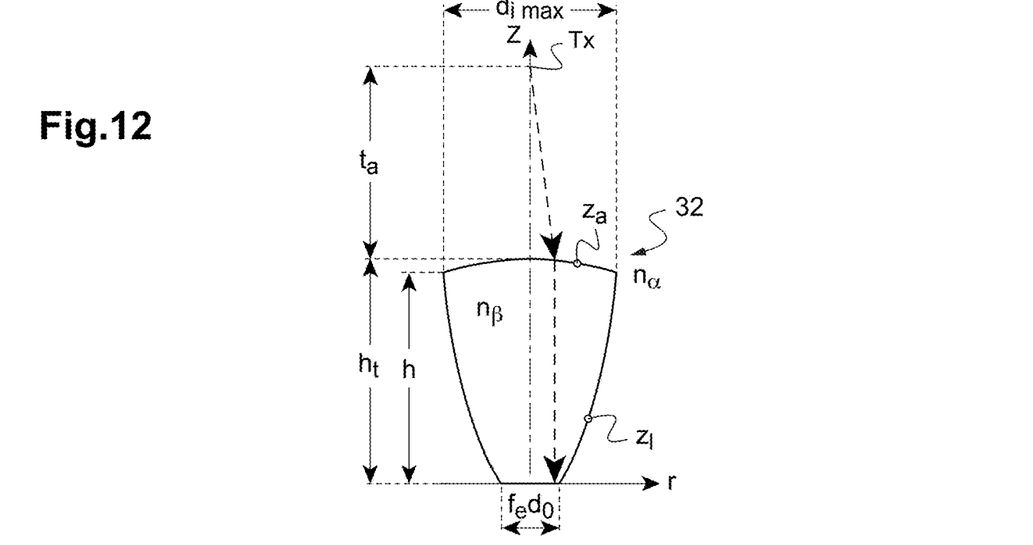
FIG. 12 shows a front view of a ECPC with a curved collecting surface.

FIG. 12 shows, in front view, a dielectric ECPC 32 with such a curved collecting surface $z_a$.

The curved collecting surface is defined by the following equation:

$$z_a = h - \frac{cd_i^2}{4 + 2\sqrt{4-(K+1)c^2 d_i^2}} - \frac{1}{4}\sum_{j=2}^{N} C_{2j} d_i^{2j} + \frac{cr^2}{1+\sqrt{1-(K+1)c^2 r^2}} + \sum_{j=2}^{N} C_{2j} r^{2j} + t_e. \tag{42}$$

where:
c is the curvature at the vertex. If the rays inside the lens are to be free of spherical aberration, this curvature is defined by:

$$c = -\frac{1}{(n_\beta/n_\alpha - 1)t_a}, \tag{43}$$

$n_\beta$ being the refractive index of the material used to manufacture the optical concentrator, $n_\alpha$ being an index of a medium wherein the optical concentrator is immersed, $t_a$ being a distance between a vertex of the collecting surface and a light source Tx with which the optical signal receiving device communicates;

K is the conic constant. It is recommended that it be hyperbolic, i.e.:

$$K=-(n_\beta/n_\alpha)^2 \tag{44}:$$

$C_{2j}$ are the N–1 aspheric deformation coefficients;
h is the height of the optical concentrator without the collecting surface;
$d_i$ is the diameter of the collecting surface.
$t_e$ is the thickness at the edge.

The total corrected height of the optical concentrator is then:

$$h_t = z_a(0) = h - \frac{cd_i^2}{4+2\sqrt{4-(K+1)c^2 d_i^2}} - \frac{1}{4}\sum_{j=2}^{N} C_{2j} d_i^{2j} + t_e. \tag{45}$$

In the case of a hollow ECPC, this curved collecting surface is embodied by a collection lens. This collection lens has an upper collection surface whose shape is defined by (42) and a rear surface whose shape is defined by:

$$z_b = h - \frac{cd_{imax}^2}{4+2\sqrt{4-(K+1)c^2 d_i^2}} - \tag{46}$$

-continued $$\frac{1}{4}\sum_{j=2}^{N}C_{2j}d_i^{2j} + \frac{cr^2}{1+\sqrt{1-(K+1)c^2r^2}} + \sum_{j=2}^{N}C_{2j}r^{2j}.$$

where c, K and $C_{2j}$ are local variables defined for this posterior surface.

It is recommended that this lens be a hyperbolic-plane lens of refractive index $n_\gamma = n_\beta$. This hyperbolic-plane lens is then assembled with the hollow concentrator obtained at the end of the previous phases so as to replace its collecting opening 23.

In the case of a dielectric concentrator, the correction of the collecting surface 10 is simply done by modifying the equation of the collecting surface 10 using (42).

As mentioned above, the intermediate phase is optional: the design method described here could be implemented while maintaining a flat collecting surface.

It should be noted, however, that the intermediate phase, if implemented, is likely to alter the optimum height and therefore the optimum overall size of the optical concentrator 28.

The design method according to the invention then comprises a third phase which consists of verifying that the optimal overall size of the ECPC 28 is acceptable in relation to integration constraints in the reception device. The integration constraints consist, for example, of not exceeding a height and/or width and/or length of a volume designed to accommodate the optical concentrator.

If this is the case, the output parameters are validated to produce the ECPC 28.

If this is not the case, i.e., if the resulting ECPC 28 is too bulky, the design process comprises a fourth phase.

If the ECPC 28 comprises a hollow concentrator, the fourth phase first comprises a first correction step, and/or a second correction step and then a third correction step. The first correction step is to change the expansion factor of the ECPC, which changes the diameter of the collecting surface and the optimal diameter of the coupling surface of the ECPC but does not change the optimal height of the ECPC nor the shape of the parabolic generatrix. The second step is to give the ECPC 28 an effective height that is less than the maximum height, so as to achieve an acceptable overall size for the optical concentrator 28. This is referred to as "truncated" ECPC. The third step consists of repeating the second and intermediate phases if the latter is implemented, i.e., updating the dimensions of the curved lens added to the hollow ECPC using the values of the variables updated in equation (42), and then the third phase, until an acceptable effective overall size of the optical concentrator 28 is obtained.

If the ECPC 28 is a dielectric ECPC, the fourth step first comprises a first correction step, and/or a second correction step, and/or a third correction step. The first correction step consists of changing the expansion factor of the ECPC, which changes the diameter of the collecting surface and the optimal diameter of the coupling surface of the ECPC, but without changing the optimal height of the ECPC nor the shape of the parabolic generatrix. The second correction step consists of giving the optical concentrator 28 an effective height lower than the maximum height so as to obtain an acceptable optical concentrator overall size. The third correction step consists of increasing the second refractive index $n_\beta$ and repeating the second phase and the first intermediate phase if these are implemented, and the third phase, until an acceptable effective height of the optical concentrator 28 is obtained.

It is therefore possible to either modify the expansion of the concentrator, truncate the ECPC optical concentrator 28, or increase the refractive index $n_\beta$ and then repeat the second phase, the first intermediate phase and the third phase (with the new input parameters including the new refractive index $n_\beta$) to obtain an optical concentrator with a reduced effective height but which, thanks to this reduction in the refractive index, presents an acceptable gain. Alternatively, the three corrections can be performed in a combined manner.

The design method just described is therefore suitable for maximizing the light power detected by the photodiode 7, the sensitive surface of the photodiode 7 itself, and the way the photodiode 7 is integrated into the access point 1.

Advantageously, an anti-reflection coating or a thin layer is applied to the side surface of the optical concentrator 8, at the end of its manufacture, in order to improve the performance of capture and total internal reflections of the optical concentrator 8.

Of course, the invention is not limited to the described embodiment but includes any variant falling within the scope of the invention as defined by the claims.

The invention claimed is:

1. A compound parabolic concentrator for integration into an optical signal receiving device used to implement optical wireless communication, the compound parabolic concentrator comprising a coupling surface for positioning on a sensitive surface of a photodetector of the receiving device, a collecting surface for receiving optical signals, and a side surface located between the coupling surface and the collecting surface, the side surface comprising two inclined and symmetrical parabolic portions when viewed in a cross-sectional plane passing through a reference axis of the compound parabolic concentrator, wherein the side surface $z_l$ in a cylindrical coordinate system (r,z) is defined by the following equation:

$$z_l = \frac{\left(d_o\left(\frac{1}{2} + \frac{n_\beta}{n_\alpha \sin\alpha}\right) - \sqrt{\left(r - \frac{\text{sign}(r)\Delta d}{2}\right)^2}\right)\sqrt{n_\beta^2 - n_\alpha^2 \sin^2\alpha}}{n_\alpha \sin\alpha} - \frac{n_\beta \sqrt{d_o(n_\beta + n_\alpha \sin\alpha)\left(n_\beta d_o - 2n_\alpha \sin\alpha\left(r - \frac{\text{sign}(r)\Delta d}{2}\right)\right)}}{(n_\alpha \sin\alpha)^2},$$

said equation using input parameters including $d_o$ which is a diameter of the sensitive surface of the photodetector, $\alpha$ which is an acceptance angle, $n_\alpha$ which is a first refractive index of a medium wherein the compound parabolic concentrator is to be immersed, $n_\beta$ which is a second refractive index of a material used to manufacture the compound parabolic concentrator, and $f_e$ which is a diametrical expansion factor of the compound parabolic concentrator allowing an overall diameter of the compound parabolic concentrator to be increased without increasing its height nor changing the shape of the inclined and symmetrical parabolic portions, with $\Delta d$ which is such that: $\Delta d = d_o(f_e - 1)$.

2. The compound parabolic concentrator as claimed in claim 1, wherein the compound parabolic concentrator is a dielectric concentrator, the first refractive index $n_\alpha$ and the second refractive index $n_\beta$ being such that:

$1 \leq n_\alpha \leq n_\beta$.

3. The compound parabolic concentrator as claimed in claim 1, wherein the compound parabolic concentrator is formed by an assembly of a hollow concentrator and a collection lens comprising the collecting surface.

4. The compound parabolic concentrator as claimed in claim 3, wherein a back surface $z_b$ of the collection lens in the cylindrical coordinate system (r,z) is defined by the following equation:

$$z_b = z_l(d_i/2) - \frac{c'd_i^2}{4 + 2\sqrt{4-(K'+1)c'^2 d_i^2}} - \frac{1}{4}\sum_{j=2}^{N} C'_{2j} d_i^{2j} + \frac{c'r^2}{1+\sqrt{1-(K'+1)c'^2 r^2}} + \sum_{j=2}^{N} C'_{2j} r^{2j}$$

where:
c' is a curvature at the top;
K' is a conic constant;
the $C'_{2j}$ are aspheric deformation coefficients;
$z_l(d_i/2)=h$ is a height of the compound parabolic concentrator without the collecting surface;
$d_i$ is a diameter of the collecting surface.

5. The compound parabolic concentrator as claimed in claim 1, wherein the collecting surface is curved.

6. The compound parabolic concentrator as claimed in claim 5, wherein the collecting surface $z_a$ in the cylindrical coordinate system (r,z) is defined by the following equation:

$$z_a = z_l(d_i/2) - \frac{cd_i^2}{4+2\sqrt{4-(K+1)c^2 d_i^2}} - \frac{1}{4}\sum_{j=2}^{N} C_{2j} d_i^{2j} + \frac{cr^2}{1+\sqrt{1-(K+1)c^2 r^2}} + \sum_{j=2}^{N} C_{2j} r^{2j} + t_e$$

where:
c is a curvature at the top of the collecting surface;
K is a conic constant;
the $C_{2j}$ are aspheric deformation coefficients;
$d_i$ is a diameter of the collecting surface.

7. The compound parabolic concentrator as claimed in claim 6, wherein:

$$c = -\frac{1}{\left(\frac{n_\beta}{n_\alpha}-1\right)t_a},$$

$t_a$ being a distance between the top of the collecting surface and a light source with which the optical signal receiving device is arranged to communicate.

8. The compound parabolic concentrator as claimed in claim 6, wherein:

$$K = -(n_\beta/n_\alpha)^2.$$

9. The compound parabolic concentrator as claimed in claim 6, wherein the compound parabolic concentrator is a dielectric concentrator, the first refractive index $n_\alpha$ and the second refractive index $n_\beta$ being such that $1 < n_\alpha < n_\beta$, and $t_e=0$.

10. The compound parabolic concentrator as claimed in claim 6, wherein the compound parabolic concentrator is formed by an assembly of a hollow concentrator and a collection lens comprising the collecting surface, and $t_e$ is a thickness at the edge of the collection lens.

11. The compound parabolic concentrator as claimed in claim 1, further comprising one or more antireflective or reflective layers applied to the side surface.

12. A device for receiving optical signals, comprising at least one optical assembly comprising a photodetector and a compound parabolic concentrator as claimed in claim 1, the coupling surface of which is positioned on the sensitive surface of the photodetector (7).

13. An optical wireless communication equipment, forming an access point or user terminal, comprising an optical signal receiving device as claimed in claim 12.

14. A method for manufacturing a compound parabolic concentrator intended to be integrated into an optical signal receiving device used to implement optical wireless communication, the compound parabolic concentrator comprising a coupling surface to be positioned on a sensitive surface of a photodetector of the receiving device, a collecting surface for receiving the optical signals, and a side surface located between the coupling surface and the collecting surface, the side surface comprising two inclined and symmetrical parabolic portions when viewed in a cross-sectional plane passing through a reference axis of the compound parabolic concentrator, the side surface being defined by an equation using input parameters comprising a diameter $d_o$ of the sensitive surface of the photodetector, an acceptance angle $\alpha$, a first refractive index $n_\alpha$ of a medium wherein the compound parabolic concentrator is to be immersed, a second refractive index $n_\beta$ of a material used to manufacture the compound parabolic concentrator, and a diametrical expansion factor $f_e$ of the compound parabolic concentrator to increase an overall diameter of the compound parabolic concentrator without increasing its height nor changing the shape of the inclined and symmetrical parabolic portions, wherein the method comprises the following successive phases:

a first phase comprising the step of defining the input parameters;

a second phase comprising the step of determining, from the input parameters, output parameters comprising an optimal diameter of the collecting surface, an optimal height of the compound parabolic concentrator, the equation for defining the side surface $z_l$ in a cylindrical coordinate system (r,z) that uses the input parameters being as follows:

$$Z_l = \frac{\left(d_o\left(\frac{1}{2}+\frac{n_\beta}{n_\alpha \sin \alpha}\right)-\sqrt{\left(r-\frac{\text{sign}(r)\Delta d}{2}\right)^2}\right)\sqrt{n_\beta^2 - n_\alpha^2 \sin^2 \alpha}}{n_\alpha \sin \alpha} - \frac{n_\beta \sqrt{d_o(n_\beta + n_\alpha \sin \alpha)\left(n_\beta d_o - 2n_\alpha \sin \alpha\left(r-\frac{\text{sign}(r)\Delta d}{2}\right)\right)}}{(n_\alpha \sin \alpha)^2},$$

with $\Delta d$ such that $\Delta d = d_o(f_e - 1)$, and a gain of the compound parabolic concentrator, the output parameters providing the compound parabolic concentrator with an optimal overall size for concentrating maximum radiant flux on the photodetector and optimizing its acceptance angle $\alpha$, prior to the manufacture of the composite parabolic concentrator; and a last phase of manufacturing the composite parabolic concentrator compliant with the output parameters.

15. The manufacturing method as claimed in claim 14, further comprising an intermediate phase, carried out after the second phase and before a third phase, and comprising the step of giving the collecting surface a curved shape, the third phase then comprising the steps of verifying that the optimal overall size of the compound parabolic concentrator is acceptable with respect to integration constraints into the receiving device, and validating the output parameters for manufacturing the compound parabolic concentrator if this is the case or proceeding to a fourth corrective phase prior to manufacturing if this is not the case.

16. The manufacturing method as claimed in claim 14, wherein a hollow concentrator is obtained at the end of the first phase and the second phase, and wherein the third phase comprises the step of defining a collection lens comprising the collecting surface and which is intended to be assembled with the hollow concentrator to form the compound parabolic concentrator.

17. The manufacturing method as claimed in claim 15, wherein a hollow concentrator is obtained at the end of the first phase and the second phase, wherein the third phase comprises the step of defining a collection lens comprising the collecting surface and which is intended to be assembled with the hollow concentrator to form the compound parabolic concentrator, and wherein the fourth corrective phase, implemented following the third phase in case that the optimal overall size is not acceptable, comprises a first correction step of changing the optimal diameter of the collecting surface and a diameter of the coupling surface of the compound parabolic concentrator but without changing the optimal height of the compound parabolic concentrator nor the shape of the inclined and symmetric parabolic portions, and/or a second correction step consisting of giving the hollow concentrator an effective height lower than the optimal height so as to obtain an acceptable overall size of the compound parabolic concentrator, and a third step consisting of repeating the second phase and the intermediate phase, if these are implemented, and then the third phase, until an acceptable effective overall size of the compound parabolic concentrator is obtained.

18. The manufacturing method as claimed in claim 14, wherein a dielectric concentrator (28) is obtained after the first phase and the second phase.

19. The manufacturing method as claimed in claim 15, wherein a dielectric concentrator is obtained after the first phase and the second phase, and wherein the fourth corrective step, implemented following the third step in case the optimal overall size is not acceptable, comprises a first correction step of changing a diameter of the collecting surface and the optimal diameter of the coupling surface of the compound parabolic concentrator but without changing the optimal height of the compound parabolic concentrator nor the shape of the inclined and symmetric parabolic portions, and/or a second correction step consisting of giving the dielectric concentrator an effective height lower than the optimal height so as to obtain an acceptable overall size of the compound parabolic concentrator and/or a third correction step consisting of increasing the second refractive index and reiterating the second phase and the intermediate phase, if the latter is implemented, then the third phase, until an acceptable overall size of the compound parabolic concentrator is obtained.

\* \* \* \* \*